United States Patent
Lamothe (10) Patent No.: US 8,328,103 B2
(45) Date of Patent: Dec. 11, 2012

(54) DEVICE FOR CHECKING ENERGY RECEIVED BY AN ANTENNA FOR PREVENTING DATA CORRUPTION DURING A WRITE OPERATION IN A NON VOLATILE TRANSPONDER MEMORY

(75) Inventor: Christian Lamothe, Travers (CH)

(73) Assignee: EM Microelectronic-Marin S.A., Marin (CH)

( * ) Notice: Subject to any disclaimer, the term of this patent is extended or adjusted under 35 U.S.C. 154(b) by 862 days.

(21) Appl. No.: 12/038,620

(22) Filed: Feb. 27, 2008

(65) Prior Publication Data

US 2008/0204333 A1    Aug. 28, 2008

(30) Foreign Application Priority Data

Feb. 27, 2007    (EP) .................................... 07103163

(51) Int. Cl.
    *G06K 19/06*    (2006.01)
(52) U.S. Cl. ........ 235/492; 235/375; 235/439; 235/451; 235/487
(58) Field of Classification Search .................. 235/375, 235/439, 451, 487, 492
    See application file for complete search history.

(56) References Cited

U.S. PATENT DOCUMENTS

| | | | |
|---|---|---|---|
| 5,081,570 A * | 1/1992 | Chibani et al. .................. 363/17 |
| 5,418,358 A | 5/1995 | Bruhnke et al. | |
| 5,925,139 A | 7/1999 | Yamada et al. | |
| 5,943,263 A | 8/1999 | Roohparvar | |
| 5,945,920 A * | 8/1999 | Maletsky .................... 340/10.52 |
| 6,070,804 A * | 6/2000 | Miyamoto ..................... 235/494 |
| 6,166,960 A | 12/2000 | Marneweck et al. | |
| 7,262,586 B1 * | 8/2007 | Gradinariu ..................... 323/280 |
| 2002/0172196 A1 * | 11/2002 | Komatsu et al. .............. 370/366 |
| 2003/0156436 A1 * | 8/2003 | Moreaux et al. ................. 363/49 |
| 2005/0284940 A1 * | 12/2005 | Enomoto et al. .............. 235/451 |

FOREIGN PATENT DOCUMENTS

| EP | 0 583 690 A2 | 2/1994 |
|---|---|---|
| EP | 1 434 167 A1 | 6/2004 |

OTHER PUBLICATIONS

European Search Report issued in corresponding application No. EP 07 10 3163, completed Sep. 3, 2007.
Ohanian, Hans C., Physics pp. 633-635 (1985).

* cited by examiner

*Primary Examiner* — Ali Sharifzada
(74) *Attorney, Agent, or Firm* — Griffin & Szipl, P.C.

(57) ABSTRACT

A transponder circuit includes an antenna for receiving radio frequency signals and an extraction unit for extracting therefrom energy for the transponder circuit, a non volatile memory unit, a control logic unit that activates a received energy evaluation unit when a write operation is received. The evaluation unit is arranged directly at the antenna to provide the control logic unit with a signal representative of the status of energy available in the antenna indicating whether the available energy is greater than a minimum level for ensuring a proper write operation or not, wherein the control logic unit is arranged for performing, or not performing, the write operation. The evaluation unit includes a resistive divider including a set of resistors or a programmable current source and rectifier means on each connector of the antenna for simulating a write operation in the memory and energy recoverable by the power supply.

9 Claims, 6 Drawing Sheets

DEVICE FOR CHECKING ENERGY RECEIVED BY AN ANTENNA FOR PREVENTING DATA CORRUPTION DURING A WRITE OPERATION IN A NON VOLATILE TRANSPONDER MEMORY

This application claims priority from European Patent Application No. 07103163.7, filed Feb. 27, 2007, the entire disclosure of which is incorporated herein by reference.

FIELD OF THE INVENTION

The present invention generally concerns a portable transceiver of small dimensions, also called a transponder circuit or contactless integrated circuit or an RFID tag, this transponder circuit using a radio frequency link to receive at least part of its operating energy and to communicate with another, generally more voluminous transceiver, also called a reader or base station, this base station having more energy available.

In order to operate, the transponder circuit may, depending upon the anticipated operating mode, only receive energy from the ambient electromagnetic field emitted by the base station or partly use the energy received by radio frequency and partly the energy stored or generated inside the transponder circuit. This electromagnetic field is also used for data exchange between the transponder circuit and the base station. Some data received by the transponder circuit has to be stored in a non-volatile memory unit of the transponder circuit.

The invention therefore concerns more specifically a transponder circuit adapted to allow reliable write access to its non-volatile memory unit.

BACKGROUND OF THE INVENTION

Integrated circuits that include devices ensuring reliable write access to non-volatile memories are known from the prior art. In particular, the use of a reprogrammable non volatile memory fitted with a circuit checking the programming voltage level which powers the memory in order to prevent corrupted data being written in the memory if the programming voltage is insufficient, is known from U.S. Pat. No. 5,943,263. This type of solution, based on checking the supply voltage is not suitable for the RFID domain, i.e. transmissions of data and energy by radio frequency. Indeed, in the case of a transponder circuit, it is not the voltage that powers the non-volatile memory which is indicative of the possibility of performing a reliable write operation, but rather the energy received from by the receiving antenna of the transponder circuit.

There is known from U.S. Pat. No. 5,925,139, a circuit for checking the high voltage obtained by the voltage booster circuit, such high voltage being necessary for performing a reliable write operation in a non volatile memory. This document discloses here a circuit checking the voltage necessary inside the memory and not the available energy received by an antenna for ensuring sufficient power supply to the memory in which one wishes to write. This document has the drawback of having to switch on the booster circuit in order to perform a check prior to the write operation. This check can be falsified due to the previously stored energy, which is undesirable in the case of a transponder circuit where the available energy is directly limited by the energy received.

There is also known from U.S. Pat. No. 6,166,960 a device for preventing corrupted data being written in a non-volatile memory in the event that the supply voltage is insufficient. In order to do this, the voltage booster is switched on usually by being connected to a charge representing the memory plane, and if the high voltage generated by the voltage booster is insufficient, then the write operation into the memory will not be authorised. For the same reasons as stated above, the assembly described in this document is not suitable for a transponder circuit type application.

The various existing solutions proposed in the prior art rely on two principles, one consisting in measuring the value of the supply voltage and the other consisting in switching on the voltage booster necessary for the memory to operate, in particular for write operations in the memory, and in measuring the voltage supplied to the output of the voltage booster.

However, neither of these two solutions is applicable to a transponder circuit since, in one case, measuring the supply voltage is not indicative of the energy available in the transponder circuit, and, in the other case, the evaluation period has to last as long as a real cycle for a write operation and takes account of any already stored energy.

This is why a completely different approach has to be developed to resolve the problem. Data has to be stored in a non-volatile memory without being corrupted. Any deletion or write operation in a memory requires a certain amount of energy. In the case of a transponder circuit, because of a limited energy storage capacity, or no available storage capacity, the energy essentially has to come from the radio frequency link which has a random value. Indeed, the periods of communication between the transponder circuit and the base station are interspersed with periods of rest during which the electromagnetic field is absent. Naturally, since the communication distance may vary between the transponder circuit and the base station, the energy received by the transponder circuit is thus also variable. Moreover, the amount of energy transmitted by the base station and received by the transponder circuit also depends upon the mutual position of the transmission and reception antennae. It will be noted that the small energy storage capacity that may be present in the transponder circuit is only provided for absorbing the peaks in consumption that appear at certain particular moments during a memory write operation.

It is also known that a write operation that has started cannot be interrupted before the end without endangering the integrity of the data to be stored. In the case of a transponder circuit, the potential risk of interrupting a write operation in progress is the lack of energy available to bring the operation to a normal end. It is thus imperative to know in advance, i.e. prior to starting a write operation, whether there will be enough energy to complete the operation.

It will also be noted that in order to resolve the problems linked to application to a transponder circuit, certain constraints also limit the possible applicable solutions, including:

First of all, it is not possible to accumulate reserve energy to ensure total completion of a write operation. The transponder circuit may be fitted with a battery, i.e. in the case of an "active" transponder, but the latter may be run down or simply absent, i.e. in the case of a "passive" transponder, and in any event it is not economical from the point of view of the compactness and price of components to add an additional capacitor to the final assembly in order to store the required energy. Indeed, the use of a minimum number of components outside the circuit is one of the objectives constantly sought for this type of application.

Secondly, the voltage level across the rectified and filtered supply voltage from the electromagnetic field received by the antenna is not indicative of the energy available for performing a complete write operation. The charge is stored in a filtering capacitor whose value is too low to store enough energy. Moreover, the voltage from the antenna is limited by an over voltage protector device which delivers a practically identical voltage over a large range of received energy whether or not it is sufficient for a memory write operation. Thus, even for a level of received energy that is too low, the antenna protector device or limiter enters into action and supplies a clipped voltage at a practically constant value.

SUMMARY OF THE INVENTION

It is an object of the present invention to answer the aforementioned drawbacks by providing a transponder circuit wherein it is possible to perform reliable write operations in the non-volatile memory thereof. In short, a non-volatile type memory is written in a transponder circuit using the energy received by an antenna and not having sufficient capacity to store such energy. Since the energy is received in a quantity that varies with the distance to the transmitter or base station, a check must be carried out, before performing a write operation, as to whether there will be a sufficient quantity of energy for the operation to be properly performed. The invention in question proposes resolving this problem for transponder circuits.

Thus, in accordance with the present invention, a first illustrative embodiment is provided that pertains to a transponder circuit that includes: (a) an antenna for receiving radio frequency signals and an extraction unit for extracting therefrom at least a part of the energy necessary for the transponder circuit, (b) a non volatile memory unit, (c) a control logic unit for the circuit that activates a received energy evaluation unit when a write operation is received via the radio frequency signals, wherein the evaluation unit is arranged directly at the antenna so as to provide the control logic unit with a signal (pwchok) representative of the status of the energy available in the antenna indicating whether the available energy is greater than a minimum level for ensuring a proper write operation or whether the available energy is less than the minimum level for ensuring a proper write operation, wherein the control logic unit is arranged for performing, or respectively not performing, the write operation, and wherein the evaluation unit includes a resistive divider that includes a set of resistors or a programmable current source and rectifier means on each connector of the antenna for simulating a write operation in the memory unit and the energy that can be recuperated by the power supply. In accordance with a second illustrative embodiment of the present invention, the first illustrative embodiment is modified so that it further includes (d) a transponder circuit supply voltage monitoring unit for interrupting the evaluation unit when the supply voltage of the transponder circuit is less than a predetermined transponder circuit operating threshold. In accordance with a third illustrative embodiment of the invention, the second illustrative embodiment is further modified so that the monitoring unit includes a voltage divider that returns the supply voltage to a level chosen to be comparable to a reference voltage, a hysteresis comparator for selecting the reaction time for interrupting the received energy evaluation in progress and an interruption logic unit for switching on the evaluation unit upon request and interrupting the evaluation unit.

In accordance with a fourth illustrative embodiment of the present invention, the first illustrative embodiment, the second illustrative embodiment, and the third illustrative embodiment, are further modified so that the evaluation unit further includes a logic decoder for finding out the level of energy to be evaluated, analogue control units for implementing the desired function, an amplitude detector providing the image of the voltage that will be available for the rest of the circuit during the write operation and a hysteresis comparator for comparing the available voltage level to the minimum selected voltage level for which the write operation can be properly performed in the memory. In accordance with a fifth illustrative embodiment of the invention, the first illustrative embodiment, the second illustrative embodiment, the third illustrative embodiment, and the fourth illustrative embodiment, are further modified so that the minimum level for ensuring a proper write operation is defined by a prior measurement, during manufacture of the circuit, of the true value of the energy consumed by the memory for a write operation, wherein the value is stored in the form of the minimum level in the control logic unit of the transponder circuit. In accordance with a sixth illustrative embodiment of the invention, the first illustrative embodiment, the second illustrative embodiment, the third illustrative embodiment, the fourth illustrative embodiment, and the fifth illustrative embodiment are further modified so that several energy evaluation levels are provided according to the type of write operation desired.

More generally, the present invention therefore concerns a transponder circuit including an antenna for receiving radio frequency signals and an extraction unit for extracting at least part of the energy necessary for the transponder circuit, a non volatile memory unit, a circuit control logic unit which activates a unit for evaluating the energy received when a write operation is received via the radio frequency signals, characterized in that the evaluation unit is arranged directly at the antenna so as to supply the control logic unit with a signal representing the available energy status in the antenna indicating whether the available energy is greater than a minimum energy level for properly performing a write operation or whether the available energy is less than the minimum energy level for properly performing a write operation, the control logic unit being arranged to perform, or respectively not perform, the write operation. In other words, the transponder circuit may include an antenna (1) for receiving radio frequency signals and an extraction unit (30) for extracting therefrom at least a part of the energy necessary for the transponder circuit, a non volatile memory unit (60), a control logic unit (20) for the circuit that activates a received energy evaluation unit (71) when a write operation is received by the radio frequency signals. The evaluation unit is arranged directly at the antenna so as to provide the control logic unit with a signal (pwchok) representative of the status of the energy available in the antenna indicating whether the available energy is greater than a minimum level for ensuring a proper write operation or whether the available energy is less than the minimum level for ensuring a proper write operation, wherein the control logic unit is arranged for performing, or respectively not performing, the write operation. The evaluation unit includes a resistive divider (713a, 713b) including a set of resistors or a programmable current source and rectifier means (7130) on each connector of the antenna for simulating a write operation in the memory and the energy that can be recuperated by the power supply.

In short, the invention consists in the use of a unit that evaluates the energy received by the antenna. This unit, called the evaluation unit, evaluates the energy received by the antenna, which disregards the energy stored in capacitors or generated by a battery of the transponder circuit since this would falsify the estimate of the energy actually available.

Moreover, because of the nature of the circuit, if the available energy is evaluated for a preliminary period of reduced duration, one knows that this will be enough to ensure a complete write operation in total security. Indeed, the change in the received energy level remains low during the course of such a complete write operation.

According to an advantageous embodiment of the invention, the transponder circuit further includes a unit for monitoring the transponder circuit supply voltage and means for interrupting the evaluation unit, which are activated when the transponder circuit supply voltage is less than a predetermined transponder circuit operating threshold.

Thus, according to this advantageous embodiment, the invention consists in the joint use of a unit that evaluates the energy received by the antenna and a unit that monitors the voltage level across the supply terminal of the circuit This unit, also called the monitoring unit, monitors the voltage level across the general supply terminal of the transponder circuit, which allows the premature interruption of any received energy evaluation. This case occurs in particular when the received energy level is too low. In fact, the flow of energy for the evaluation would not be sufficient to maintain the general supply voltage, which would lead to poor operation of the transponder circuit due to a lack of supply voltage. Prematurely stopping the energy evaluation makes the received energy available again for regenerating the general supply voltage.

According to an advantageous embodiment of the invention, the minimum energy level(s) for performing a proper write operation is stored in advance in the transponder circuit. In order to do this, the method consists in measuring in advance, for example during the test or characterization of the transponder circuit, the true power consumption of the memory and deducing therefrom the energy value(s) that would have to be available in order to write correctly in the memory, wherein the energy is received by the receiver antenna of the transponder circuit. The method then consists in storing the necessary energy value(s) in the transponder circuit so as to be able to use them again as minimum energy values during the received energy evaluation operations.

It will be noted that the solution chosen goes against a common prejudice that consists in believing that the voltage booster must necessarily be switched on in order to find out the true memory power consumption. In fact, this approach is simply an approximation of the real power consumption of the memory, since the voltage booster only uses a model of the memory plane which is generally represented by a resistive charge to which a capacitive charge is sometimes added.

Moreover, the solution chosen advantageously enables different received energy values to be checked depending upon the work modes of the transponder circuit, but also different memory write modes, in the knowledge that several sizes of memory plane may be envisaged. It is advantageous to be able to manage several write modes which each require different minimum energy levels in order to perform a proper write operation. Further, according to the natural variations in the manufacturing method and improvement of the same over time, for a given memory size, the energy necessary to perform a given write operation must be expected to vary. It is also preferable to leave open the possibility that the same checking device could be used for memories of different sizes, thus the proposed solution could be applied to different transponder circuits.

Additionally, it is also advantageous for the maximum distance between the transponder circuit and the base station allowing data to be written in the memory, is relatively independent of temperature and natural technological variations during manufacture of the transponder circuits. Thus, this maximum distance will preferably be adapted for memories that are among the least efficient but still acceptable, which provides the user with transponder circuits that still operate in the same manner despite the natural manufacturing variations. This ensures substantially identical operating conditions whatever the quality of the transponder circuits initially used to develop the application.

In order to do so, it will advantageously be noted that the recommended solution offers the possibility of homogenising the write distance for a given memory production even though some memories could be written with less energy. Indeed, for a given type of base station, the minimum necessary energy level corresponds to a given distance relative to the transmission antenna. The transponder circuit, which contains a non volatile memory will thus have to be at a maximum given distance in order to be able to be read owing to this received energy evaluation system. Further, it will be noted that this distance is practically independent of the ambient temperature, which is not the case for the solutions proposed by the prior art.

BRIEF DESCRIPTION OF THE DRAWINGS

Other features and advantages of the present invention will appear more clearly upon reading the following detailed description of embodiments of the invention, given by way of non limiting example and illustrated by the annexed drawings, in which.

DETAILED DESCRIPTION OF THE INVENTION

The invention will now be described in relation to FIGS. 1 to 5c in accordance with advantageous embodiments provided by way of example.

Figure 1:
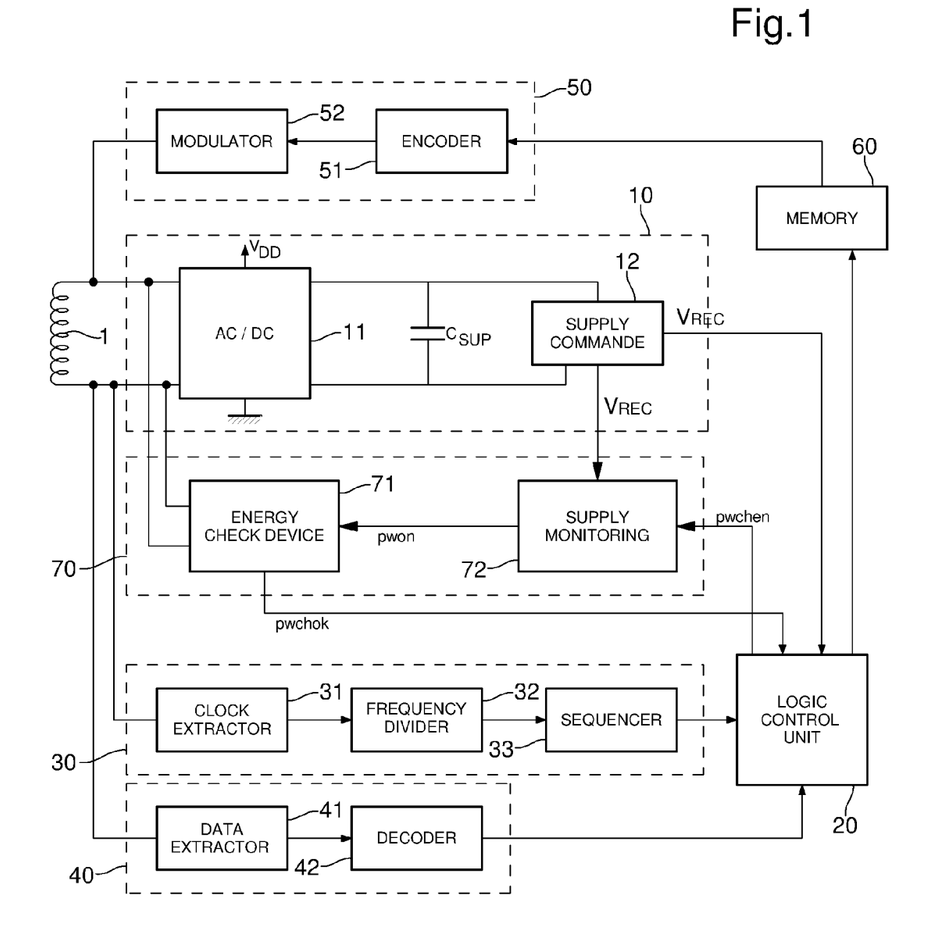
FIG. 1 shows a block diagram of a transponder circuit according to one embodiment of the invention.

FIG. 1 shows a block diagram of a transponder circuit including, in a conventional manner, an antenna 1 for receiving the signal transmitted by the transceiver of a base station, and for sending signals back to the base station, which is not shown. Antenna 1 powers a power unit 10 of the transponder, generally formed by an AC/DC converter 11, a charge capacitance Csup of the power unit and transponder power supply control means 12. This power unit 10 powers, in particular, a control logic unit 20, which processes the received data and determines the state of the transponder. Any other power unit for recuperating the energy received from the radio frequency signal could of course be envisaged for powering the transponder circuit.

Antenna 1, which receives the signals transmitted by the base station, is connected to a synchronisation unit 30 of the transponder circuit across the base station, including for example clock signal extracting means 31, followed by frequency divider means 32, followed by a sequencer 33. The clock signal extracting means 31 recuperate a clock signal at the carrier frequency used by the base station. The frequency divider means 32 lower the extracted clock signal to the transponder circuit working frequency. The same antenna 1 is also connected to a reception unit 40 for receiving 41 and decoding 42 the commands sent by the base station. Antenna 1 also transmits response signals to the base station, and in order to do so, the antenna is also connected to a modulation unit 50 formed by an encoder 51 followed by a modulator 52.

The transponder circuit also includes a non-volatile type memory unit 60 for containing its own information, such as its serial number and external information received from the base station.

The control logic unit 20 of the transponder circuit is connected to all of the other units so as to be able to control each of them and to generate the data stored in memory unit 60 in accordance with received commands.

It is clear from the problem raised that the only energy that can be reliably used for writing in non volatile memory unit 60 is the energy picked up by antenna 1 from the electromagnetic field transmitted by the base station, provided that there is a sufficient quantity of such energy at the moment that it is needed. It is thus this energy that has to be evaluated. Any other energy evaluation taking into account the previously stored energy will only falsify the estimate as to the real available energy value when control logic unit 20 sends a write or programming instruction to memory unit 60.

The adopted solution essentially consists in providing means for evaluating the available energy directly at the antenna. According to a preferred embodiment, which will be detailed with reference to FIGS. 2 and 4, the available energy is evaluated by drawing electrical current at the antenna through a programmable resistor and checking whether the amplitude of the voltage at the terminals of this resistor is above or below a predefined voltage level. Since the choice of programmable resistor values occurs during the test phase of the transponder circuit prior to marketing, the values to be used may be placed in the non volatile memory, for example in the circuit itself.

More generally, the transponder circuit thus also includes a write operation authorisation unit 70 including an available energy evaluation unit 71, also called an energy controller, arranged directly at the antenna. This evaluation unit 71 is preferably only activated upon command, via the signal pwon in accordance with the embodiment shown with monitoring unit 72, or directly by the signal pwchen, to evaluate the available energy picked up by antenna 1 and provides a response in the form of binary data pwchok indicating whether the available energy is greater or less than a predetermined energy level corresponding to the minimum energy necessary to perform a proper write operation in memory unit 60.

According to the advantageous embodiment shown in FIG. 1, write operation authorisation unit 70 further includes a unit 72 monitoring the transponder circuit supply voltage, which controls the available supply voltage to ensure that the transponder circuit operates properly during an evaluation period, the latter being able to perform other tasks in parallel with the available energy check.

It is very advantageous to divide write operation authorisation unit 70 into two units: evaluation unit 71 and monitoring unit 72, since evaluation of the available energy by evaluation unit 71 happens to the detriment of the energy that the transponder unit can use for other tasks. Indeed, the transponder circuit operates by using the power source Vrec provided by the power command 12, which is regenerated by the energy received by antenna 1. If the received energy is in abundance there is no problem, but if there is not enough energy then, during a received energy evaluation period, the level of supply voltage Vrec is liable to not be sufficiently regenerated, to the point of causing the transponder circuit to operate poorly, which should preferably be avoided. It is for this purpose that monitoring unit 72 prematurely interrupts, via the signal pwon, evaluation of the received energy despite the order initially received. The interruption to the energy evaluation has two consequences. First of all, the energy that was being consumed for the evaluation becomes available for regenerating the transponder circuit power source Vrec which enables the latter to operate in normal conditions. Secondly, the write operation authorisation signal pwchok resulting from the energy evaluation, is reset to "0", which means insufficient energy for a write operation into memory 60. Naturally, in this case, the information is stored such that regeneration of the supply voltage level Vrec does not alter the information that the energy is insufficient. In order to restart the energy evaluation mechanism, a complete new cycle must be started with the command pwchen.

Naturally, if the power filtering capacitor Csup is sufficiently large, it is possible for the energy received by the antenna to be insufficient, but for the supply level Vrec to remain correct during the entire available energy evaluation period, which does not cause any premature interruption to the received energy evaluation function. In such case, the evaluation unit could evaluate the value of the energy received by the antenna, without this evaluation being falsified by preliminary storage of a certain quantity of previously received energy.

Because of the nature of its operation, this has the advantage of allowing evaluation unit 71 to be reused in different integrated circuits, because the energy measurement is not spoiled by errors due to any prior energy storage. Moreover, this unit is well suited to integrated circuit technology since the solution used disregards components external to the circuit. It also disregards the value that the power filtering capacitor may have. Moreover, in the advantageous embodiment using a power monitoring unit 72, authorisation unit 70 is also capable of taking the decision to interrupt an energy evaluation which could endanger the proper working of the circuit. It will also be noted that the evaluation unit has the advantage of homogenising the memory write distance and thus removes disparities from one part to another.

Figure 2:
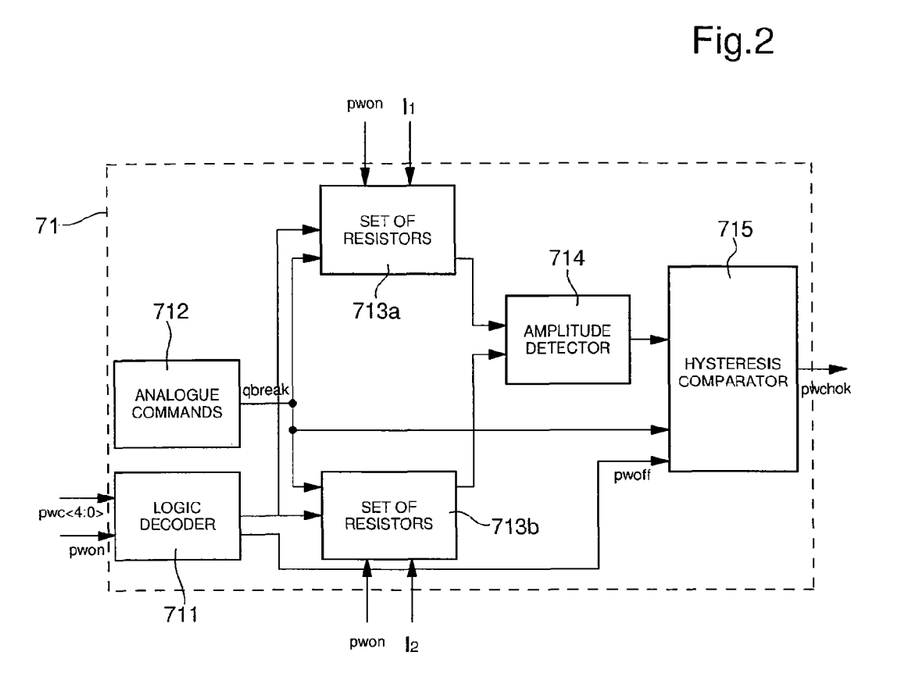
FIG. 2 shows a block diagram of the evaluation unit according to a preferred embodiment of the invention.

FIG. 2 shows a block diagram of the evaluation unit according to a preferred embodiment of the invention. Evaluation unit 71 is advantageously, according to the example shown, broken down into six units, including a logic decoder 711, an analogue command unit 712, two units 713a and 713b each including a set of resistors, an amplitude detector 714 and at output, a hysteresis comparator 715.

Logic decoder 711 converts received instructions (pwc<4:0>) into commands that can be directly comprehended by the analogue units, namely in particular units 713a and 713b each including a set of resistors or a programmable current source. In fact, these instructions received by logic decoder 711 concern the energy levels to be evaluated whose values were defined prior to the transponder circuit test and stored in the circuit so that the circuit control logic unit can apply them during operation.

The analogue command unit 712 supplies polarising currents and delays for switching on the desired function.

The two units 713a and 713b, which are chosen to have an identical structure, are each connected across one of the antenna connectors I1 and I2. At the heart of one of these units 713a, 713b, which will be described in more detail below with reference to FIG. 3, the received voltage present in the power supply unit is first of all rectified, which means that the value of the voltage that can be recuperated by supply Vrec during a write operation can be appreciated. A resistive divider adapts the voltage level to the reference value based on a bandgap voltage. Then, the received energy is passed through a set of resistors, each of the resistors being able to be switched on or off by closing or opening a corresponding switch, so as to simulate different energy consumptions with respect to the memory to be written. The assembly relying on two units 713a and 713b is symmetrical relative to the two connectors I1 and I2 and to the system earth. This structure has the advantage of perfectly simulating the power consumption on each alternation of the waves picked up by antenna 1. Consequently, the peak voltage obtained after rectifier 7130 will be a faithful image of the voltage that could be obtained from the rectified voltage as a function of the energy or controlled current level. In fact, rectifier 7130 is sized in ratio to the internal rectifier for recuperating energy in order to power the transponder.

The amplitude detector 714 includes a double alternating rectifier whose two inputs originate from the resistive dividers of units 713a and 713b, and a frequency filter for storing the maximum amplitude from the two preceding units 713a and 713b. This function provides an image of the voltage that will be available for the rest of the circuit while the memory is being written, i.e. during a write operation. As the rectified filtered value is affected by an error due to the detection threshold of the rectifier, the next operation consists in correcting this error by adding the voltage value corresponding to the voltage threshold introduced by the rectifier. The corrected voltage is found at the output of the amplitude detector. This voltage is preferably filtered a second time, which further reduces the voltage residue that was not filtered by the first stage.

Finally, at the output, hysteresis comparator 715 provides information as to whether the voltage level is lower or higher than a reference level at each moment. This reference level corresponds to the threshold that we appraised as the minimum energy level for which a write operation could be performed in the memory in a completely reliable manner.

Figure 3:
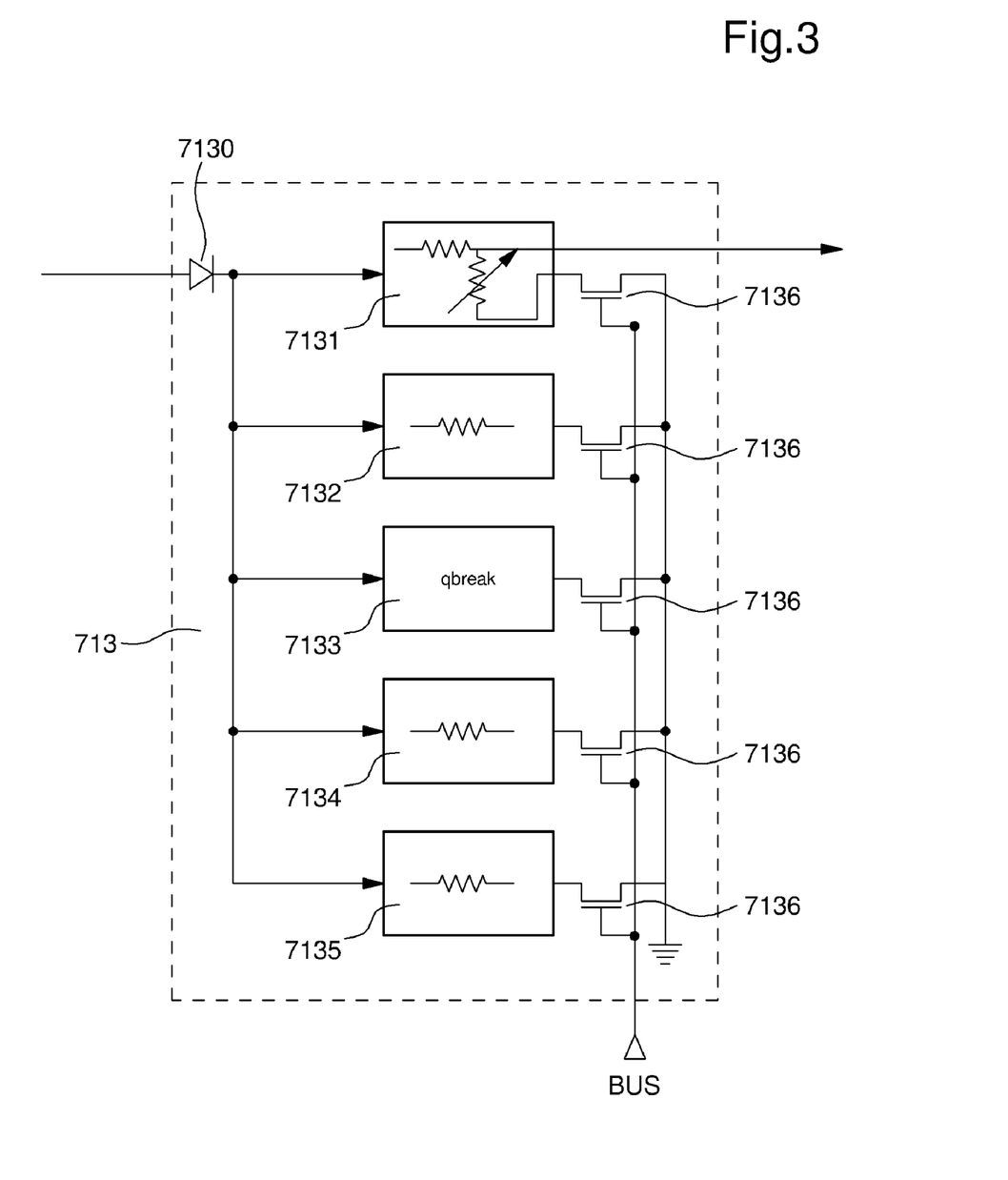
FIG. 3 shows a more detailed diagram of an example write operation simulation unit.

FIG. 3 shows in more detail an example of one of the write operation simulation units, designated by the reference 713a or 713b in FIG. 2. The components of this unit 713 are distributed in the diagram in five rows, each row being provided with a switch 7136, which switches the associated component on or off. Starting from the top of the diagram, the first row contains voltage divider 7131, which is always switched on when one wishes to perform an energy evaluation. This resistive divider 7131 represents the minimum energy level that one wishes to check, i.e., if the switch 7136 associated with this resistive divider 7131 is closed, but the switches associated with the following rows are open, the voltage at the output of unit 713 will correspond to a first minimum voltage. This resistive divider 7131 may also be programmed for example by a metal mask. The second, fourth and fifth rows each include a resistor 7132, 7134 and 7135, which may be switched on by closing a corresponding switch 7136. All of these switches 7136 are also electronically controlled, the commands coming from a BUS shown in FIG. 3. The resistors 7132, 7134, 7135 allow higher energy levels to be controlled: if a switch 7136 associated to one of resistors 7132, 7134, 7135 is closed, this will increase the energy quantity flowing through unit 713 shown in FIG. 3. Different energy levels can thus be simulated depending upon the energy considered to be necessary. Some configurations could also be programmable by metal mask. The third row 7133 breaks the quality factor of the antenna by the command qbreak. The advantage of this function is that the energy accumulated in the antenna can be quickly evacuated and evaluated when it has accumulated in the antenna once the rapid evacuation period has ended. This option is also metal mask programmable.

This received energy evaluation thus occurs by passing a quantity of energy, similar to that used by a memory during a write operation, through a set of resistors. In this manner, these units 713 minimise the adaptations necessary for their use in different integrated circuits because of the simple commands that can evaluate a vast energy range, in addition to the possible options set by mask.

Figure 4:
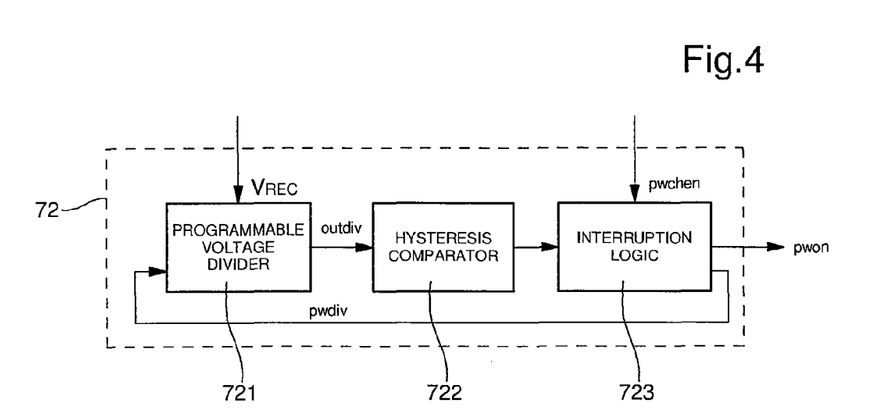
FIG. 4 shows a block diagram of a supply voltage monitoring unit according to a preferred embodiment of the invention.

FIG. 4 shows a block diagram of the supply voltage monitoring unit according to a preferred embodiment of the invention. Supply voltage monitoring unit 72 is advantageously divided into three units, including a programmable voltage divider 721, a hysteresis comparator 722 and an interruption logic unit 723, which processes the data, i.e. on the one hand the order to switch on the monitoring unit and on the other hand the value of the supply voltage relative to a reference. Thus, the interruption logic unit can take the decision to interrupt an evaluation in progress or even not to undertake the energy evaluation, if there is a risk of causing an energy shortage preventing the rest of the transponder circuit from operating properly.

Voltage divider 721 returns the supply voltage Vrec to the desired level for comparison to a reference voltage. This divider mainly includes a transistor controlled by a signal pwdir, which definitively disconnects the reference voltage divider until the end of an operation. The control signal pwdir comes from interruption logic unit 723, which will be detailed below. This divider 721 is associated with a lowpass filter formed by another transistor connected at the output signal outdiv, whose time constant allows hysteresis comparator 722 to prepare itself to work after being switched on without generating any transitory impulses, which could compromise the proper working of the desired function. In fact, the transitory state could be interpreted as a low voltage level by logic unit 723 and could therefore cause an unjustified interruption to the received energy check, by incorrectly diagnosing that supply voltage Vrec is insufficient.

Hysteresis comparator 722 preferably has metal mask programming for choosing the reaction time in case it is necessary to interrupt the received energy evaluation. In fact, the level of degradation achieved by supply voltage level Vrec depends upon the rapidity of the reaction time. Advantageously, account will be taken of a security margin according to the worst possible cases. This comparator 722 is in the data processing chain which consists in finding out whether a received energy evaluation can be performed without endangering the proper operation of the transponder circuit. As previously mentioned, the received energy evaluation can prevent the supply voltage Vrec of the circuit from being properly regenerated, in particular in the event of an energy shortage. One must, therefore, be able to interrupt this evaluation in order to leave available the small amount of received energy so as not to prevent the application in progress from working properly.

Upon the demand of signal pwchen, logic unit 723 switches on the energy evaluation operation via signal pwon and also interrupts it if a problem has been detected with the level of supply voltage Vrec. This is thus the last data processing stage relating to the value of supply voltage Vrec necessary for an optimised operation of the entire circuit.

Figure 5A:
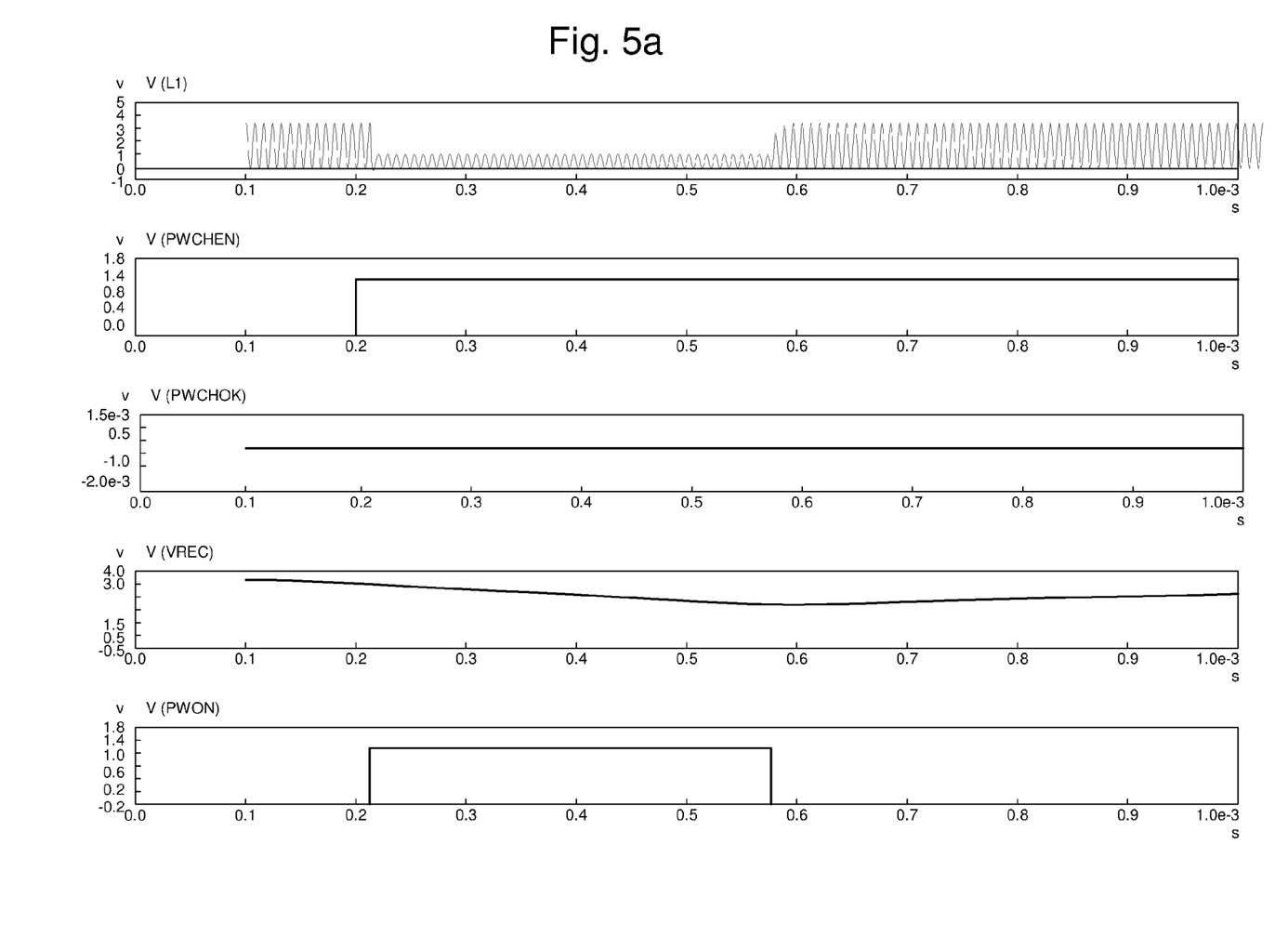
FIG. 5a shows a first simulation with interruption due to insufficient internal power supply.
Figure 5B:
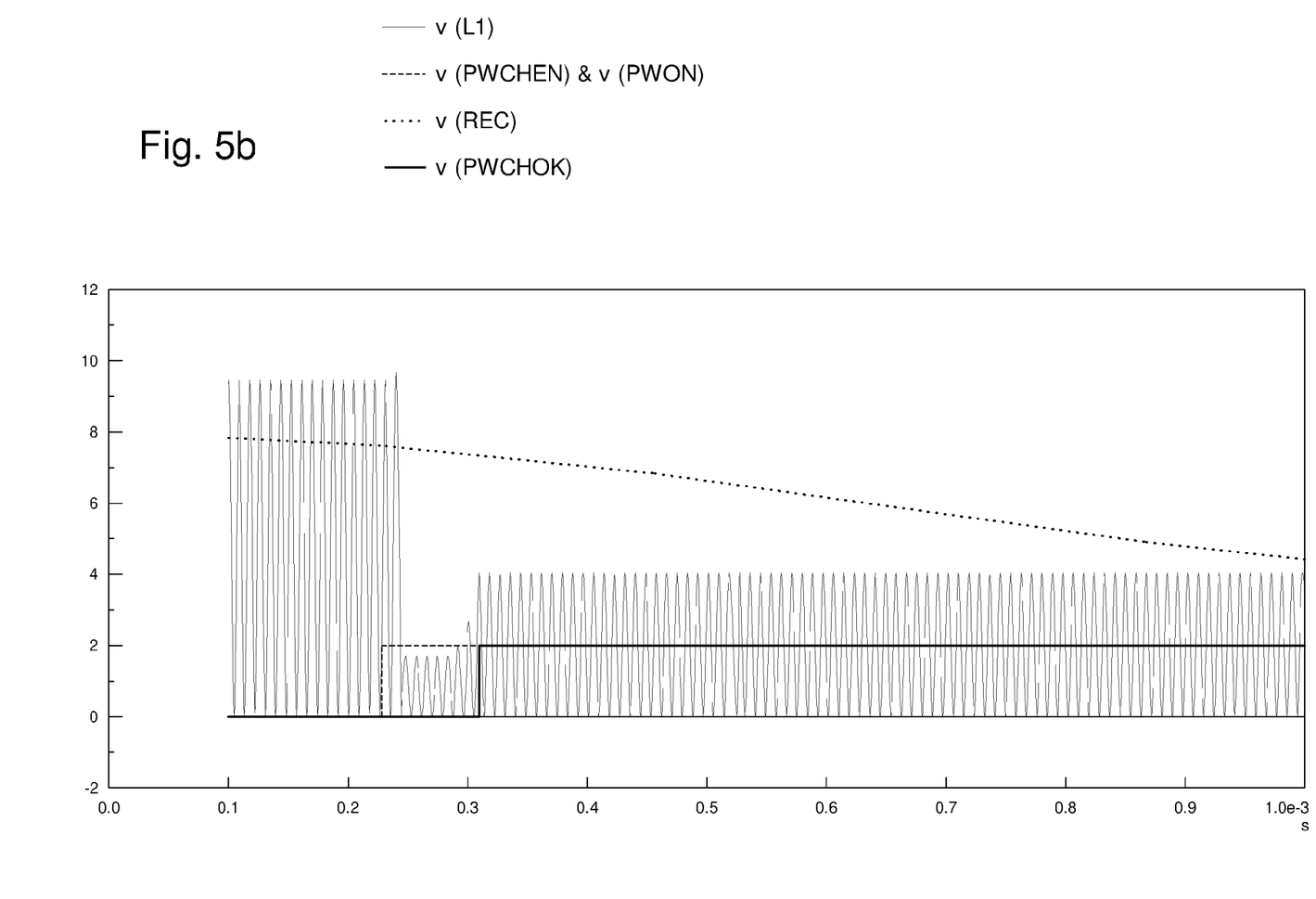
FIG. 5b shows a second simulation without any interruption when the received energy is sufficient.
Figure 5C:
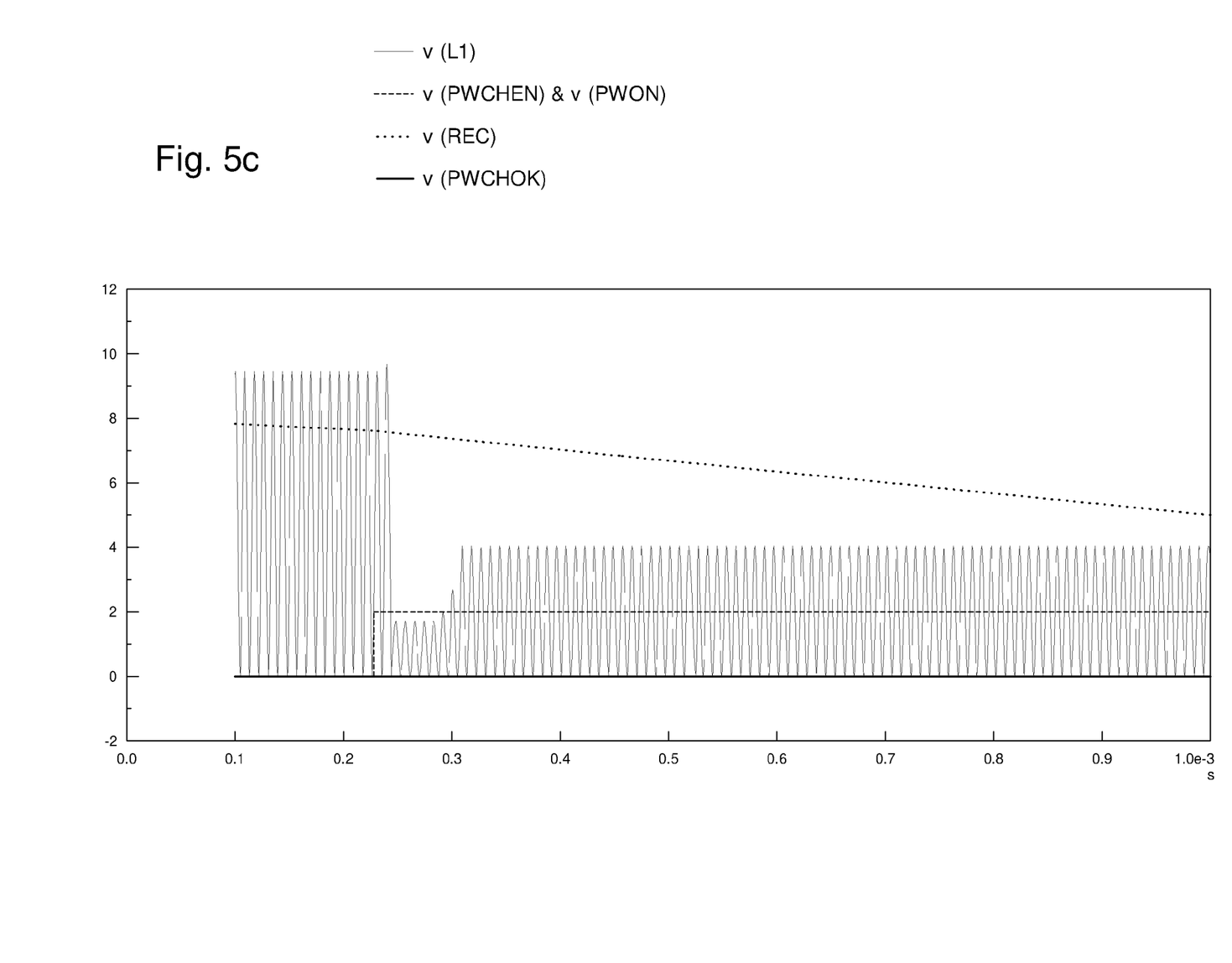
FIG. 5c shows a third simulation with interruption when the received energy is insufficient.

The various simulations that follow were performed for a transponder circuit according to the invention. These different simulations include the voltage at one of the connectors of the antenna V(I1), the supply voltage Vrec supplied by the rectifier, the signal pwchok, which is the indicator of the received energy level the evaluation of which is controlled by signal pwchen, and signal V(pwon) indicating the real evaluation operation command but especially the interruption of the latter. It will be noted that in this simulation version, the additional programming possibilities have not been used.

FIG. 5a shows a first simulation with interruption due to insufficient internal power supply. This first simulation shows that upon the request for an energy evaluation, required by the high level of signal pwchen, the authorisation unit can start to perform the task requested. At the same time, the internal signal pwon controlled by the monitoring unit, passes to "1", the high level, and the voltage across the antenna V(I1) decreases. Consequently, the supply voltage level Vrec is no longer regenerated. When the supply voltage approaches a predetermined minimum security zone, the monitoring unit decides to interrupt the energy evaluation by the evaluation unit since the latter is visibly insufficient, in the knowledge that continuing the evaluation would endanger the proper working of the whole transponder circuit. The monitoring unit thus resets the internal control signal pwon to "0" despite the general command pwchen which is generated by the control logic unit of the circuit, which is external to the authorisation unit. Consequently, the voltage level across the antenna V(I1) increases again and the available supply voltage Vrec is properly regenerated, therefore preventing improper working of the circuit. It will be noted that, according to this first simulation, the signal pwchok has never passed to "1", which indicates to the control logic unit that uses this information, that the energy level is insufficient.

FIG. 5b shows a second simulation without any interruption when the received energy level is sufficient. The second simulation shows the case of an energy evaluation when the latter is sufficient. When the energy evaluation order is switched on, via signal pwchen, the voltage level V(I1) across the antenna collapses, which corresponds to the period during which the antenna quality factor is broken, emptying the antenna of accumulated energy. After this period, the voltage level V(I1) across the antenna increases and stabilises. After some time, signal pwchok passes to "1" indicating to the circuit that the energy level is sufficient to allow a reliable write operation in the memory.

FIG. 5c shows a third simulation with interruption when the received energy is insufficient. The third simulation is similar to the preceding one but the energy is not sufficient without however the voltage across the supply terminal compromising the proper operation of the circuit. There is a similar timing diagram to that of the preceding simulation, except that this time signal pwchok remains stuck at "0" indicating to the circuit that the energy level is insufficient to ensure a reliable write operation in the memory.

It will be noted finally that, by way of variant, instead of the set of resistors 713a, 713b shown in FIG. 3, it is possible to use a programmable current source that could be generated from a current mirror made in the same technology as the rest of the circuit, wherein the output transistor replaces the resistors and the mirror control transistor receives a calibrated current derived from the bandgap reference. The current could be programmed either in the control transistor or in the output transistor.

What is claimed is:

1. A transponder circuit including:
(a) an antenna for receiving radio frequency signals;
(b) an extraction unit for extracting from the radio frequency signals received by the antenna at least a part of energy necessary for powering the transponder circuit;
(c) a non volatile memory unit;
(d) a received energy evaluation unit;
(e) a control logic unit for the transponder circuit, wherein the control logic unit is operably connected to send a write or programming instruction to the non volatile memory unit, and wherein the control logic unit activates the received energy evaluation unit when a write operation is received via the received radio frequency signals, wherein the evaluation unit is arranged directly at the antenna so as to provide the control logic unit with a first signal representative of a status of the energy available in the antenna indicating whether the available energy is greater than a minimum level for ensuring a proper write operation or whether the available energy is less than the minimum level for ensuring a proper write operation, wherein the control logic unit performs the write operation when the available energy is greater than the minimum level, and the control logic unit does not perform the write operation when the available energy is less than the minimum level, and the evaluation unit comprises a write operation simulation unit that includes
  i. a resistive divider;
  ii. a set of resistors arranged in parallel with the resistive divider, or a programmable current source; and
  iii. rectifier means on each connector of the antenna for simulating a write operation in the memory unit and for simulating energy recuperable by a power supply of the transponder circuit, wherein the rectifier means is operably connected to at least the resistive divider; and
(f) a transponder circuit supply voltage monitoring unit that interrupts the received energy evaluation unit when a supply voltage of the transponder circuit is less than a predetermined transponder circuit operating threshold, wherein the transponder circuit supply voltage monitoring unit includes
  i. a voltage divider that returns the supply voltage to a level chosen to be comparable to a reference voltage;
  ii. a hysteresis comparator for selecting a reaction time for interrupting the received energy evaluation unit while a received energy evaluation is in progress; and
  iii. an interruption logic unit for switching on the received energy evaluation unit upon request and interrupting the received energy evaluation unit.

2. The transponder according to claim 1, wherein the received energy evaluation unit further includes
a logic decoder for finding out the level of energy to be evaluated, wherein the logic decode is operably connected to the write operation simulation unit;
an analogue control unit for implementing a desired function, wherein the analogue control unit is operably connected to the write operation simulation unit;
an amplitude detector providing an image of the voltage that is available for the rest of the transponder circuit during the write operation, wherein the amplitude detector is operably connected to receive input from the write operation simulation unit; and
a hysteresis comparator for comparing an available voltage level to a minimum selected voltage level for which the write operation can be properly performed in the non volatile memory unit, wherein the hysteresis comparator is operably connected to receive input from the amplitude detector.

3. The transponder circuit according to claim 1, wherein the minimum level for ensuring a proper write operation is defined by a prior measurement, obtained during manufacture of the transponder circuit, of a true value of the energy consumed by the memory unit for a write operation, wherein the true value is stored in the form of said minimum level in the control logic unit of the transponder circuit.

4. The transponder circuit according to claim 1, wherein several energy evaluation levels are provided according to the type of write operation desired.

5. The transponder circuit according to claim 1, wherein the antenna is connected to a synchronisation unit of the transponder circuit, and the synchronisation unit includes a clock signal extracting means.

6. A transponder circuit including:
(a) an antenna for receiving radio frequency signals;
(b) an extraction unit for extracting from the radio frequency signals received by the antenna at least a part of energy necessary for powering the transponder circuit;
(c) a non volatile memory unit;
(d) a received energy evaluation unit; and
(e) a control logic unit for the transponder circuit, wherein the control logic unit is operably connected to send a write or programming instruction to the non volatile memory unit, and wherein the control logic unit activates the received energy evaluation unit when a write operation is received via the received radio frequency signals, wherein the received energy evaluation unit is arranged directly at the antenna so as to provide the control logic unit with a first signal representative of a status of the energy available in the antenna indicating whether the available energy is greater than a minimum level for ensuring a proper write operation or whether the available energy is less than the minimum level for ensuring a proper write operation, wherein the control logic unit performs the write operation when the available energy is greater than the minimum level, and the control logic unit does not perform the write operation when the available energy is less than the minimum level, and the received energy evaluation unit comprises
i. a write operation simulation unit that includes
   (1) a resistive divider;
   (2) a set of resistors arranged in parallel with the resistive divider, or a programmable current source; and
   (3) rectifier means on each connector of the antenna for simulating a write operation in the memory unit and for simulating energy recuperable by a power supply of the transponder circuit, wherein the rectifier means is operably connected to at least the resistive divider, and
wherein the received energy evaluation unit further includes
ii. a logic decoder for finding out the level of energy to be evaluated, wherein the logic decoder is operably connected to the write operation simulation unit;
iii. an analogue control unit for implementing a desired function, wherein the analogue control unit is operably connected to the write operation simulation unit;
iv. an amplitude detector providing an image of the voltage that is available for the rest of the transponder circuit during the write operation, wherein the amplitude detector is operably connected to receive input from the write operation simulation unit; and
v. a hysteresis comparator for comparing an available voltage level to a minimum selected voltage level for which the write operation can be properly performed in the non volatile memory unit, wherein the hysteresis comparator is operably connected to receive input from the amplitude detector.

7. The transponder circuit according to claim 6, wherein the minimum level for ensuring a proper write operation is defined by a prior measurement, obtained during manufacture of the transponder circuit, of a true value of the energy consumed by the memory unit for a write operation, wherein the true value is stored in the form of said minimum level in the control logic unit of the transponder circuit.

8. The transponder circuit according to claim 6, wherein several energy evaluation levels are provided according to the type of write operation desired.

9. A transponder circuit including:
(a) an antenna for receiving radio frequency signals;
(b) an extraction unit for extracting from the radio frequency signals received by the antenna at least a part of energy necessary for powering the transponder circuit;
(c) a non volatile memory unit;
(d) a received energy evaluation unit;
(e) a control logic unit for the transponder circuit; and
(f) a transponder circuit supply voltage monitoring unit that interrupts the received energy evaluation unit when a supply voltage of the transponder circuit is less than a predetermined transponder circuit operating threshold,
wherein the control logic unit is operably connected to send a write or programming instruction to the non volatile memory unit, and wherein the control logic unit activates the received energy evaluation unit when a write operation is received via the received radio frequency signals, wherein the received energy evaluation unit is arranged directly at the antenna so as to provide the control logic unit with a first signal representative of a status of the energy available in the antenna indicating whether the available energy is greater than a minimum level for ensuring a proper write operation or whether the available energy is less than the minimum level for ensuring a proper write operation, wherein the control logic unit performs the write operation when the available energy is greater than the minimum level, and the control logic unit does not perform the write operation when the available energy is less than the minimum level, and the received energy evaluation unit comprises
i. a write operation simulation unit that includes
   (1) a resistive divider;
   (2) a set of resistors arranged in parallel with the resistive divider, or a programmable current source; and
   (3) rectifier means on each connector of the antenna for simulating a write operation in the memory unit and for simulating energy recuperable by a power supply of the transponder circuit, wherein the rectifier means is operably connected to at least the resistive divider, and
wherein the received energy evaluation unit further includes
ii. a logic decoder for finding out the level of energy to be evaluated, wherein the logic decoder is operably connected to the write operation simulation unit;
iii. an analogue control unit for implementing a desired function, wherein the analogue control unit is operably connected to the write operation simulation unit;
iv. an amplitude detector providing an image of the voltage that is available for the rest of the transponder circuit during the write operation, wherein the amplitude detector is operably connected to receive input from the write operation simulation unit; and
v. a hysteresis comparator for comparing an available voltage level to a minimum selected voltage level for which the write operation can be properly performed in the non volatile memory unit, wherein the hysteresis comparator is operably connected to receive input from the amplitude detector.

* * * * *